Aug. 16, 1955 F. T. ANDREWS, JR 2,715,657

ELECTRICAL INFORMATION SYSTEM

Filed Aug. 2, 1952

INVENTOR
F. T. ANDREWS, JR.
BY
[signature]
ATTORNEY

United States Patent Office 2,715,657

Patented Aug. 16, 1955

2,715,657

ELECTRICAL INFORMATION SYSTEM

Frederick T. Andrews, Jr., Morristown, N. J., assignor to Bell Telephone Laboratories, Incorporated, New York, N. Y., a corporation of New York Application August 2, 1952, Serial No. 302,444

12 Claims. (Cl. 179—26)

This invention relates to electrical systems for transmitting to a control station information concerning the condition of any of a plurality of lines remote therefrom and particularly to the transmission to a central office of a telephone system signals indicating the condition of any of a plurality of subscriber lines emanating from a satellite office remote from the central office.

In various types of electrical networks or systems, the situation may arise that it is desirable to be able to determine at one point the condition of lines or terminals at another point, which lines or terminals may be electrically unconnected to the apparatus at the one point and may be physically quite remote therefrom. One case in which this situation arises is in telephone systems wherein it is desired to employ a number of satellite stations to which the subscriber lines are connected and which in turn are connected to a common central office by a number of trunks. Such a telephone system is described in the application Serial No. 302,371, filed August 2, 1952, by K. S. Dunlap and C. A. Lovell, whereby, as explained therein, considerable savings in the telephone plant can be attained, particularly by the more efficient use of the copper in the system attainable thereby.

To make fullest employment of the advantages of such a system the satellite offices should perform, under the direction of the central office, certain routing or distribution functions, as described in the Dunlap-Lovell application. It is therefore necessary for the central office to know, before initiating a routing action, the condition of the subscriber's line. Further it is desirable that the central office be aware of the destination of a subscriber's call before it connects that subscriber's line to a trunk into the central office. Advantageously, by identifying both the calling subscriber in the satellite office and the number being called before connecting the subscriber to an idle trunk, the call can be set up directly in the central office before the subscriber is connected thereto.

It is one object of this invention to enable the determination of the condition of any of a number of lines or terminals remote from a central station and to relay that information to that central station.

It is another object of this invention that a number of lines be scanned in succession without the employment of any mechanical or rotating parts, whereby the scanning equipment may more readily be utilized in an unattended location.

It is a further object of this invention to provide an improved line scanning means for determining the condition of any of a number of telephone subscriber lines emanating from a satellite office and relaying that information to the central office remote from the satellite office.

It is a further object of this invention that the central office have sufficient information transmitted to it to identify both the particular subscriber desiring to be connected through to it on a trunk between the satellite office and the central office and the ultimate destination of the call before the subscriber is connected to such a trunk, so that the central office may first set up the appropriate connection in the central office for completing the call.

It is a still further object of this invention that the information of the condition of the remote lines or terminals be transmitted to the central station in a form such that line attenuation and induced noises from outside sources will not obscure the information.

These and other objects of this invention are attained in one specific illustrative embodiment by the provision of means for generating a series of pulses to be applied in succession to one wire or terminal of each of the lines being scanned. Each line is thus assigned a time slot in the scanning cycle. The pulses are transmitted out along the one wire of the line, transmitted through the terminating impedance, and returned along the other wire of the line. The pulses are then applied to a common resistance, the voltage across the resistance due to application of the pulse to the line being dependent upon the termination of the line. Specifically, in one embodiment of this invention comprising a telephone system the line may advantageously have a short circuit termination when the telephone receiver is in an on-hook condition or when dialing, or terminate in the telephone subset impedance, when the telephone receiver is in an off-hook condition.

In accordance with a feature of this invention, the pulse received and applied to the common resistance is then applied to a common input terminal of a detector network which comprises two multivibrator circuits and an add circuit. The two multivibrator circuits may be identical but the initial electronic device, which may advantageously be a transistor though discharge devices may also be employed, of one multivibrator circuit is biased to trip on reception of any pulse above one level while the initial electronic device of the other circuit is biased to trip on the reception of any pulse above a second level. In the specific embodiment described above comprising a telephone system, the one device is biased to trip on reception of a pulse indicative of a subset impedance termination of the line while the other device will not trip on that pulse but will on one indicating that there is a short circuit terminating the line of that particular time slot. Thus the tripping level of the one multivibrator is set so that the smallest pulse obtained from any line being scanned will cause it to trip while the tripping level of the other multivibrator is such that it will trip for the smallest signal indicating an on-hook condition but will not trip on any off-hook signal.

The output of the one multivibrator is taken from the first electronic device or transistor and the output of the other multivibrator is taken from the second electronic device or transistor so that the signs of the two outputs are reversed and the one output is considerably larger than the other. These two outputs are both applied to the add circuit of the detector network, and the resultant signal from the add circuit is transmitted to the central station or office. Thus, if the line is in the condition such that both multivibrator circuits trip, as when the receiver is on hook in the embodiment described above, outputs from both multivibrator circuits will be applied to the add circuit and the resultant signal transmitted to the central office in that line's time slot will have an amplitude determined by the difference of these outputs and a sign determined by the larger of the outputs. If the pulse applied to the detector network is only sufficient to trip one multivibrator circuit, the resultant output from the add circuit will be just this one smaller output which will be of opposite sign to that of the other case.

Further in this specific embodiment of this invention it is possible to transmit information denoting a third condition. Thus, in the specific embodiment described above comprising a telephone system, means are provided for preventing the transmission of scanning signals on the lines if there is a call set up on the line, in which case no pulse will be applied to the detector network. Thus when the line is busy, neither multivibrator will trip and the output from the add circuit to the central office in that particular line's time slot will be zero.

It is therefore one feature of this invention that means be provided for applying in succession a pulse to one wire or terminal of each of a plurality of lines for transmission along that wire, the pulses being returned along the other wire of the line from the termination of the line. More specifically it is a feature of one specific embodiment of this invention comprising a telephone system wherein the lines are the subscriber lines, that means be provided for terminating the subscriber lines in a short circuit when the telephone instrument is idle or when dialing pulses are being transmitted and for terminating the lines in the telephone subset impedance when the telephone instrument is in use but no call has yet been set up on the subscriber line of that instrument.

It is a further feature of this invention that the pulses returned from the line termination be applied across a common output resistor and that means be provided for translating the pulse amplitude modulated chain of signals received from the lines being scanned into a ternary code. More specifically, it is a feature of this invention that the translating means comprise a detector network to which the pulse chain from the common output resistor is applied, the detector network comprising a pair of multivibrator circuits and an add circuit for combining the output of the two multivibrator circuits.

It is a still further feature of this invention that means be provided for allowing the one multivibrator circuit of the detector network to trip on application thereto of any pulse from the common output resistor while means be provided to allow the other multivibrator circuit to trip only on application of a pulse reflected from one of the possible terminating impedances of the scanned lines. More specifically, in one embodiment comprising a telephone system, it is a feature of this invention that means be provided for allowing both multivibrators to trip on reception of a scanning pulse of an amplitude determined by a short circuit termination of the subscriber's line in the time slot of which the pulse occurs and that means be provided for allowing only one of the multivibrators to trip on reception of a scanning pulse of an amplitude determined by a subset impedance termination of the scanned subscriber's line of that time slot.

It is a still further feature of this invention that means be provided for preventing the application of scanning pulses to the scanned lines when another condition exists on the lines. More specifically, it is a feature of this invention in one embodiment comprising a telephone system that means be provided for preventing application of the scanning pulses to one wire of the subscriber's line when a call has been set up on that line. More particularly it is a feature of this invention that such means comprise means for applying a potential to the wire of the subscriber's line with which the scanning generator is associated on the establishment of a call on that particular subscriber line and unidirectional current means, such as a varistor, for preventing passage of the scanning pulse therethrough when that potential is applied to that one wire of the subscriber line.

It is a still further feature of this invention that means be provided for applying the output signals of the multivibrator circuits to the add circuit such that the outputs are of opposite sign and the one output of the circuit only tripped on reception of the larger amplitude pulse is of larger amplitude than the output of the other circuit, whereby the output of the add circuit in the scanning time slot of each line is a ternary signal which may comprise a pulse of one polarity, a pulse of the opposite polarity, or the absence of any pulse, trunk means being also provided for the transmission of this ternary signal to the remote central station or office.

These and other features of this invention will be readily understood with reference to the following detailed description and accompanying drawing, in which.

Figures 1, 2, 3:
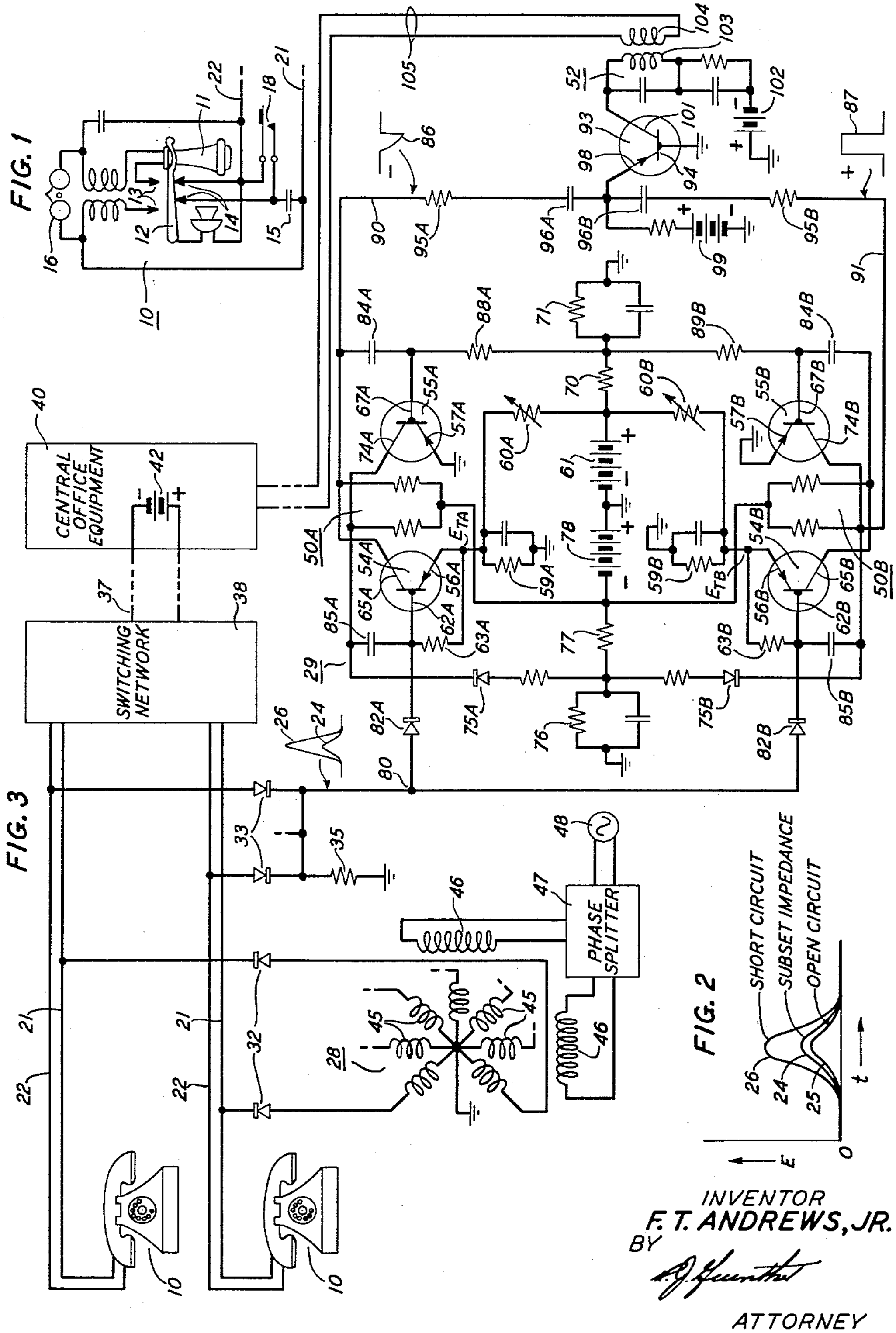
Fig. 1 is a schematic representation of a telephone subset employable in one specific illustrative embodiment of this invention wherein the lines being scanned are telephone subscriber lines from a remote satellite office and it is desired to relay to the central office information indicating at any time the condition present on any one of the subscriber lines.
Fig. 2 is a graphical representation of pulses after being returned from three possible terminations of such subscriber lines, when transmitted along those lines in accordance with this invention.
Fig. 3 is a schematic representation of one specific embodiment of this invention showing particularly the scanning pulse generator and the detector network.

Turning now the drawing, Fig. 1 shows a schematic representation of the telephone subset 10 employed in one embodiment of this invention. As there depicted, the subset 10 is arranged, as is generally the case, so that removal of the receiver 11 from the hook 12 will cause the completion of the subscriber loop through the contacts 13. However, when the receiver 11 is on the hook 12, the subscriber line or loop is terminated in a capacitor 15 through the contacts 14, the capacitor being thus in parallel with the ringer 16. The capacitor is effectively a short circuit in the frequency spectrum of the scanning pulse but presents a high impedance to the ringing current. In one specific embodiment of this invention, the capacitor 15 may advantageously be one microfarad and thus present 8000 ohms impedance to 20 cycle ringing current. The dial contacts, which are shown schematically as contacts 18, are connected in the subset 10 to momentarily reconnect the capacitor 15 across the loop when the receiver 11 is off the hook 12 and the subscriber is dialing.

Fig. 2 shows the amplitude of the pulse received from subset 10 under three possible terminating conditions if a pulse of given amplitude is applied to the one wire 21 of the subscriber line and detected on the other wire 22 of the subscriber line. Pulse 24 is received if the line is terminated in the subset impedance, which is the case when the receiver 11 is off the hook and the subscriber is not dialing. Pulse 25 is for the case of a complete open circuit termination, which would occur when the receiver 11 is on the hook 12 in the absence of the contacts 14 and capacitor 15. As is apparent the difference between pulses 24 and 25 is not too great and might not be a recognizable difference in a commercially feasible system. However, the difference between these two pulses and pulse 26 is considerable. Pulse 26 is for the condition of the short circuit termination of the subscriber loop, which occurs either when the subscriber's receiver 11 is on the hook 12 or when it is off hook, but the subscriber is dialing.

Turning now to Fig. 3, there is shown one specific embodiment of this invention in which scanning pulses are generated by a scanning pulse generator 28, transmitted to each of the subsets 10 in succession over the wire 21 of that particular subscriber line, removed from the wire 22, and detected and transmitted to the central office by the detection network 29, as described further below. Each lead of the pulse generator 28 is connected to a wire 21 by a rectifying varistor 32 while all of the wires 22 are multipled together through rectifying varistors 33 to a common resistor 35. The pulse appearing across the resistor 35 in a particular time slot in the scanning cycle of the pulse generator 28 therefore indicates the condition of the line associated with that time slot. The pulse repetition or sampling rate on each line by the scanner is considerably higher than the dialing rate so that the scanner is capable of following the dial pulses.

In one specific embodiment of the invention the scanning sampling rate is 60 cycles per second while the dialing rate is only 20 cycles per second. The scanner can thus transmit to the central office a request for service from a particular subscriber in a remote or satellite office and then the subsequent dialing information so that the central office will have received information both as to the subscriber desiring service and the call desired before a trunk 37 is connected by the switching network 38 to the subscriber line to connect it through to the central office 40.

Advantageously in accordance with this invention, the establishment of a connection between the subscriber's line or loop and a trunk 37 to the central office 40, whether on a terminating call or on an originating call after dialing, results in balanced direct current voltages being applied to the loop wires 21 and 22 as by a voltage source 42 in the central office. The polarity of the applied voltages is such that the associated varistors 32 and 33 in the scanning circuit are back biased. This prevents scanning pulses from interfering with conversation, eliminates cross-talk between lines through the scanning circuit, and provides an indication in the time slot of that subscriber line that the line is busy on a completed call, as described further below.

The scanning pulse generator 28 may be of any of several known types capable of producing a pulse on each wire 21 of the subscriber lines in time sequence. This may readily be attained by the use of saturable magnetic cores which are driven from saturation in one direction to saturation in the other direction at a given driving rate, such as at a 60 cycle per second rate. The driving magnetization force is advantageously large so that the time during which the change in flux between the two extremes takes place is short. Since a voltage is induced in the coil winding only during this change, a pulse of the proper duration is produced. A complete cycle of output voltage from each coil consists of both a positive and a negative pulse corresponding to flux reversals of both senses. One specific pulse generator 28 that may advantageously be utilized employs laminated Permalloy cores on which the windings 45 are mounted in a polyphase field produced by two field coils 46 connected through a phase splitter 47 to an alternating current source 48. The rotation of the magnetic field impresses a sinusoidal force across the magnetic cores, the phase of this force on a particular core being dependent on the angular position of that core. The time occurrence of a pulse generated by a winding 45 is thus determined facilely by the mechanically adjustable angular position of the associated core in the rotating magnetic field. However, other pulse generators may be employed, one such other generator utilizing a number of closed saturable magnetic core transformers having two primary windings of different numbers of turns connected to two voltage sources 90 degrees apart and a single secondary winding connected to the wire 21.

The signal thus developed across the common scanning resistor 35 by the returned pulses is a pulse amplitude modulated train, each pulse of which is in a particular line time slot. The signal in any time slot may be the absence of a pulse, if the line is busy, a pulse indicative of a subset impedance termination of the line, or a larger pulse indicative of a short circuit termination of the line. Since the percentage modulation, i. e., the ratio of off-hook to on-hook pulses is small for lines associated with long loops, this pulse amplitude modulated train is not itself an entirely satisfactory signal for transmission to the central office. The attenuation of the trunk from the scanner to the central office together with induced noises from outside sources might obscure the intelligence conveyed by the signal. It is therefore desirable to convert the signal to a form with greater tolerance to interference and, in accordance with a feature of this invention, the signal is converted from the pulse amplitude modulated train to a ternary signal by a detector network 29.

The detector network 29 translates the pulse amplitude modulation pulses produced across the resistor 35 into a ternary code. It comprises two multivibrator circuits 50A and 50B and an adding circuit 52. Each multivibrator circuit 50 advantageously includes two transistors 54 and 55 though other electric devices could be employed. The transistors 54 have their emitters 56 biased positively at a potential $E_T$ determined by the voltage divider comprising resistance 59 and variable resistance 60 connected between a voltage source 61 and ground, but the base 62 is returned to the emitter 56 through a resistance 63 which may advantageously be of 10,000 ohms. The emitters 57 of the transistors 55 are advantageously grounded. Under these conditions current flows to the collectors 65 of transistors 54 and the transistors are in the so-called high current state. The bases 67 of the transistors 55 are biased positively with respect to the emitters 57 by means of a voltage divider comprising the resistances 70 and 71 connected between the voltage source 61 and ground. Under these conditions the collectors 76 for the transistors 55 draw each a smaller current than that flowing in the transistors 54 and the transistors 55 are in the so-called low current state. The voltage of collector 74 is clamped by the diode or varistor 75 to the voltage determined by the voltage divider comprising resistances 76 and 77 connected between a voltage source 78 and ground.

The tripping level of the transistors 54, i. e., the amplitude of a pulse applied at the input terminal 80 to cause a pulse to appear at the collector 65 is determined by the bias potential $E_T$ and thus by the relative values of the resistances 59A, 60A, 59B and 60B. In accordance with one aspect of this invention, the transistor 54A, and thus the multivibrator 50A, trips when a pulse of an amplitude 24 determined by reflection from a subset impedance is applied to the terminal 80 while the transistor 54B, and thus the multivibrator 50B, will not trip unless a pulse of an amplitude 26 determined by a short circuit termination of the lines 21 and 22 is applied to the terminal 80. In this latter case as pulse 26 is larger than pulse 24 both transistors 54 will be tripped. Thus when there is an off-hook condition, i. e., the telephone receiver 11 is off the hook 12 and the telephone impedance terminates the line, a pulse 24 is applied across resistor 35 to the common input terminal 80 and then to diodes or varistors 82. As this pulse exceeds $E_{TA}$, which may advantageously be about 4 volts positive, but not $E_{TB}$, which may advantageously be about 7 volts positive, current will only flow through the input diode 82A to the base 62A of the transistor 54A. This pulse applied to base 62A makes the base more positive with respect to the emitter 56A, decreases the collector current, and thus causes the collector voltage to go more negative. This negative change on the collector 65A of the transistor 54A is applied to the base 67A of the transistor 55A through the coupling capacitor 84A and results in an increase in current in the collector 74A with a concomitant positive change in the collector voltage.

This positive change on the collector 74A is in turn coupled back to the base 62A of the first transistor 54A by the coupling capacitor 85A where the positive change aids the initial tripping pulse. The resulting regenerative action continues until the current conditions of the two transistors have been reversed. Following this reversal the base 62A of the first transistor 54A discharges towards emitter potential by virtue of the base current, the collector 65A of transistor 54A charges toward the voltage of the potential source 78 by virtue of the collector current and the charging current holds the base 67A negative with respect to the emitter 57A, and the collector 74A draws a constant high current and stays during this period at a voltage considerably higher than its normal biasing potential. In one specific embodiment of this invention wherein the potential of source 78 was 45 volts, the voltage on collector 65A decreased from about —7 to about —15 volts while the potential on collector 74A increased from approximately —30 volts, the normal bias applied to it by the voltage divider resistances 76, 77 and source 78, to about —5 volts.

Because the current in base 62A is larger than the current in collector 65A and the total voltage change to complete the charging or discharging process is smaller in the base circuit than in the collector circuit, the base will reach emitter potential $E_{TA}$ before the collector reaches its normal bias potential. This initiates the reverse switching action and the transistors are returned to their original current conditions, the elapsed time being determined largely by the coupling capacitors and the base 62A current. After the return action, overshoot of base 67A is rapidly discharged through a base biasing resistor 88A. The original charge on capacitor 85A is rapidly re-established by virtue of the clamping arrangement on collector 74A including the varistor 75A which provides a low impedance charging path.

When the pulse applied across the common resistor 35 is determined by a short circuit termination of the lines 21 and 22, that is, the pulse 26 indicating an on-hook condition, the pulse applied at terminal 80 of the detecting circuit thereby is sufficiently large to be greater than both $E_{TA}$ and $E_{TB}$ and thus to pass through both diodes or varistors 82A and 82B. In this case the action of the multivibrator circuit 50A will be as described above while the action of the multivibrator circuit 50B will be identical with that described above for the similar elements of that circuit.

The multivibrator circuit 50A is connected to the adding circuit 52 by a lead 90 connected to the collector 65A while the multivibrator circuit 50B is connected to the adding circuit 52 by a lead 91 connected to the collector 74B. Thus when both multivibrators have tripped the two outputs will represent the changed conditions on the two transistors of the multivibrator circuit. As noted above the change on the collector 65 of the transistor 54 is a decrease in voltage during the period when the conducting conditions of the transistors are reversed, while the change on collector 74 of transistor 55 is an increase in voltage during this period, the increase being a substantially square pulse of considerably larger size than the corresponding decrease in the potential of the collector of the other transistor. Thus the output of the A multivibrator circuit is a comparatively small negative pulse 86 while the output of the B multivibrator circuit is a considerably larger positive pulse 87.

These two outputs are added together in the add circuit 52 which comprises a transistor 93 having its base 94 grounded and both leads 90 and 91 connected through resistances 95 and capacitors 96 to the emitter 98, which may advantageously be biased by a source of potential 99. The collector 101 is biased by a source 102 and has connected thereto the primary 103 of a transformer, the secondary 104 of which is connected by a trunk 105 to the remote central office equipment.

If a pulse 24 appears across the common output resistor 35 in a line's time slot, the signal transmitted to the central office by the trunk 105 in that line's time slot will therefore be a negative pulse as only the A multivibrator circuit will trip and apply a negative pulse to the add circuit 52. If a pulse 26 appears across the common resistor 35 in the line's time slot the signal transmitted in that time slot to the office will thus be a positive signal, as both the A and B multivibrator circuits will trip. Similarly, if no pulse appears across the output resistor 35, the signal transmitted in that time slot to the central office will be the absence of a pulse.

In the operation of this invention as applied to telephone systems, there will normally appear at the central office in a particular subscriber's time slot a pulse of one polarity indicating that the telephone is idle which, in this specific embodiment is a positive pulse. When the subscriber picks up the telephone to place a call, a series of negative pulses will appear in the time slot to alert the central office equipment that a request for new service is about to be made by the subscriber identified with that time slot. Since the pulse repetition or sampling rate is advantageously 60 cycles per second on each line, a number of such new service request negative pulses will be transmitted over the trunk 105 in the delay between the time the subscriber picks up the telephone and starts dialing.

The scanner will then transmit to the central office through the detector network samples of the dial pulses, the dial pulses being transmitted to the central office as positive pulses in this specific embodiment as the dial contacts 18 act to place the short circuiting capacitance 15 again across the line during dialing. As dialing is generally performed on a 20-cycle per second basis and the scanning rate is advantageously 60 cycles per second, the scanner is capable of following the dial pulses. The scanner in accordance with this invention can thus transmit to the central office a request for service and subsequent dialed information for each of the subscribers connected to the satellite office, simultaneously if necessary, the information for any one subscriber being transmitted in that particular subscriber's time slot independently of the others.

When this invention is employed with automatic telephone systems this dial pulse information is most advantageously then stored in the central office and the calling line identified by its time slot while the central office sets up a connection in the central office between an idle trunk 37 from the calling subscriber's satellite office and an idle trunk to either the called exchange or the called satellite office. If the call is to a subscriber connected to another satellite office associated with that central office, the central office can ascertain whether the called line is busy by determining the presence or absence of a pulse in the called subscriber's time slot. The central office can then simultaneously operate the switching network in the satellite office to connect the calling ubscriber's line to the trunk 37 and send the calling information over the called trunk, if the called subscriber is in another exchange, or connect directly to the called subscriber if he is in the same exchange.

It is to be understood that the above-described arrangements are illustrative of the application of the principles of this invention. Numerous other arrangements may be devised by those skilled in the art without departing from the spirit and scope of the invention.

What is claimed is:

1. An electrical system for scanning a plurality of lines each comprising a pair of wires and transmitting information indicating the condition of the lines to a central office remote from said lines comprising a detector network, means for transmitting a pulse along one wire of each of said lines in succession, means for applying the pulses returned from the other of said wires of said lines to said detector network, the amplitude of said returned pulses depending on the termination of said lines, means comprising said detector network for discriminating between returned pulses of two different amplitudes and translating said different amplitude pulses into pulses of opposite signs, and means for transmitting said pulses of opposite sign to the central office.

2. An electrical system comprising a plurality of lines each comprising a pair of wires, a central office remote from said lines, a detector network, scanning generator means for transmitting a pulse along one wire of each of said lines in succession, means for applying the returned pulses from the other of said wires to said detector network, the amplitude of said returned pulses depending on the termination of said lines corresponding to two possible conditions on said lines, means for preventing the transmission of a pulse along said one wire of any of said lines when a third possible condition exists on any of said lines, means comprising said detector network for discriminating between pulses of two different amplitudes and translating said different amplitude pulses into pulses of opposite signs, and means for transmitting said pulses of opposite signs to said remote central office whereby said central office is informed of the condition of said lines by the presence of pulses of either polarity or the absence of pulses in the scanning sequence.

3. An electrical system comprising a plurality of lines each comprising a pair of wires, a central office remote from said lines, means for transmitting a pulse along one wire of each of said lines in succession, a detector network comprising a pair of multivibrator circuits and an add circuit, means for applying the returned pulses from the other of said wires of said lines to said detector network, the amplitude of said returned pulses being dependent on the termination of said lines, means for tripping both of said multivibrator circuits on application to said detector network of a pulse of one amplitude determined by one termination on said lines and for tripping only one of said circuits on application to said detector network of a pulse of a larger amplitude determined by a second termination on said lines, means for applying output pulses from said multivibrator circuits to said add circuit such that pulses of opposite sign are supplied by said add circuit corresponding to said pulses of different amplitudes, and means for transmitting said pulses of opposite sign to said central office.

4. An electrical system for scanning in sequence a plurality of lines each comprising a pair of wires and transmitting information indicating the condition of said lines to a central office remote from said lines comprising a detector network, means for transmitting a pulse along one wire of each of said lines in succession, means for applying the returned pulses from the other of said wires of said lines to said detector network, the amplitude of said returned pulses depending on the termination of said lines, means comprising said detector network for discriminating between returned pulses of two different amplitudes and translating said amplitude pulses into pulses of opposite signs, said last-mentioned means comprising a first and a second multivibrator circuit each comprising a pair of electron devices, means for biasing the first device of said first circuit to trip on application to said network of a pulse of either amplitude, means for biasing the first device of said second circuit to trip only on application to said network of a pulse of the larger amplitude, an add circuit, means applying the output of said first multivibrator circuit from said first device to said add circuit, and means applying the output of said second multivibrator circuit from the second device thereof to said add circuit, and means for transmitting said pulses of opposite sign from said add circuit to the remote central office.

5. An electrical system in accordance with claim 4 wherein said pulses of two different amplitudes depend on two terminations of said lines corresponding to two possible states of said lines and further comprising means for preventing the transmission of a pulse along said one wire of said lines when a third possible state exists on any of said lines, said central office thereby being informed of the condition of said lines in any of said three possible states by the presence of pulses of either polarity or the absence of pulses in the scanning sequence.

6. An electrical system for scanning a plurality of lines and transmitting information concerning the condition of said lines to a central office remote from said lines comprising a first and a second multivibrator circuit, means applying pulses of different amplitudes depending on the condition of said lines to both of said multivibrator circuits, means rendering said first circuit responsive to pulses of a first minimum amplitude and rendering said second circuit responsive only to pulses of a larger minimum amplitude, an add circuit for combining the outputs of said multivibrator circuits, means applying an output of one sign from said first multivibrator circuit to said add circuit and an output of the opposite sign from said second multivibrator circuit, whereby said add circuit output represents the differential of said multivibrator circuit outputs, and means for transmitting said add circuit output signal to the remote central office.

7. An electrical system for scanning a plurality of lines and transmitting information concerning the condition of said lines to a central office remote from said lines comprising a first and a second multivibrator circuit, each of said circuits comprising a pair of transistors, means for applying pulses of two different amplitudes in response to the two different conditions on said lines to the first transistor of each of said circuits, means for biasing the first transistor of said first circuit to be responsive to pulses of either amplitude, means for biasing the first transistor of said second circuit to be responsive only to pulses of the larger of said amplitudes, output means for said first circuit connected to the collector of the first transistor of said circuit, output means for said second circuit connected to the collector of the second transistor of said circuit whereby the outputs of said circuits are of opposite polarity, and an add circuit comprising a transistor for combining the outputs of said multivibrator circuits.

8. A signalling system comprising a plurality of telephones, a line connected to each of said telephones, each of said lines comprising a pair of wires, means for transmitting a pulse along one wire of each of said lines in succession, means for presenting a short circuit termination of said lines to said pulses when said telephones are idle, means for terminating said lines in the subset impedance of said telephones when said telephones are in use, a detector network, means for applying to said detector network pulses returned from the termination of said lines along the other of said wires, the amplitude of said returned pulses being dependent on said termination, means comprising said detector network for discriminating between returned pulses of two different amplitudes and translating said different amplitude pulses into pulses of opposite signs, and means for transmitting said pulses of opposite sign to the remote central office.

9. A signalling system in accordance with claim 8 wherein said detector network comprises a pair of multivibrator circuits and an add circuit, means for applying said reflected pulses to both of said multivibrator circuits, means for tripping both of said multivibrator circuits on application thereto of a pulse of amplitude determined by a short circuit termination on one of said lines and for tripping only one of said multivibrator circuits on application thereto of a pulse determined by a subset impedance termination on one of said lines, and means for applying output pulses from said multivibrator circuits to said add circuit such that pulses of opposite sign are supplied by said add circuit to said second-mentioned transmitting means corresponding to said reflected pulses of different amplitudes.

10. A signalling system comprising a plurality of telephones, a line connected to each of said telephones, each of said lines comprising a pair of wires, generator means for transmitting a scanning pulse along one wire of each of said lines in sequence, means for presenting a short circuit termination on said lines to said pulses when said telephones associated therewith are idle, means for preventing the transmission of a pulse on said one wire of a line when a call has been set up on said line, means for terminating said lines in the impedance of said telephone when said telephone has been removed from its idle condition but no call has been set up on the line associated therewith, a detector network, means for applying to said network pulses returned from the termination of said lines along the other of said wires, the amplitude of said pulses being dependent upon the termination of said lines, means comprising said detector network for discriminating between returned pulses of two different amplitudes and translating said different amplitude pulses into pulses of opposite signs, and means for transmitting said pulses of opposite sign to said central office whereby said central office is apprised of the condition of each of said lines by the presence of pulses of opposite signs or the absence of pulses in the scanning sequence.

11. A signalling system in accordance with claim 10 comprising also means for presenting a short circuit termination on said lines during dialing, the scanning rate being substantially faster than the dialing frequency whereby said scanning pulses are able to follow said dialing and samples of said dialing signals are transmitted through said detector network to said central office.

12. An electrical system for scanning a plurality of telephone lines each comprising a pair of wires and transmitting information indicating the condition of said lines to a central office remote from said lines comprising means for transmitting a scanning pulse along one wire of each of said lines in sequence, means for presenting a short circuit termination on said lines to said pulses when the telephones associated therewith are idle, means for preventing the transmission of a scanning pulse on said one wire of a line when a call has been set up by the central office on said line, means for terminating said lines in the impedance of the associated telephone when the telephone has been removed from its idle condition but no call has been set up on the line associated therewith, a first and a second monostable multivibrator circuit, each of said circuits comprising a pair of electron devices, means for applying to the first devices of said circuit pulses returned from the termination of said lines along the other of said wires, said returned pulses being substantially of either of two amplitudes dependent on the termination of said lines, means for biasing the first device of said first circuit to be responsive to pulses of either amplitude, means for biasing the first device of said second circuit to be responsive to pulses of the larger of said amplitudes only, an add circuit, output means for said first multivibrator circuit connected to the first device thereof for supplying an output pulse to said add circuit on the tripping of said first multivibrator circuit, output means for said second circuit connected to the second device thereof for supplying an output pulse to said add circuit on the tripping of said second multivibrator circuit, whereby said output pulses are of opposite polarity and the output pulses of said second multivibrator circuit is of substantially larger amplitude than that of said first multivibrator circuit, and means for transmitting to the remote central office the pulses of opposite sign from said add circuit whereby said central office is apprised of the condition of each of said lines by the presence of pulses of opposite signs or the absence of pulses in the scanning sequence of said telephone lines.

No references cited.